(12) United States Patent
Isogai

(10) Patent No.: US 7,503,175 B2
(45) Date of Patent: Mar. 17, 2009

(54) ENGINE CONTROL SYSTEM HAVING TURBOCHARGER

(75) Inventor: Nobumasa Isogai, Hekinan (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/334,464

(22) Filed: Jan. 19, 2006

(65) Prior Publication Data

US 2006/0162333 A1 Jul. 27, 2006

(30) Foreign Application Priority Data

Jan. 26, 2005 (JP) ............... 2005-018161

(51) Int. Cl.
*F02B 33/44* (2006.01)
(52) U.S. Cl. .............. 60/607; 60/605.2; 60/608
(58) Field of Classification Search ........ 60/605.2, 60/607–609
See application file for complete search history.

(56) References Cited

U.S. PATENT DOCUMENTS

| | | | |
|---|---|---|---|
| 4,757,686 A | | 7/1988 | Kawamura et al. |
| 4,998,951 A | * | 3/1991 | Kawamura ............ 60/608 |
| 5,076,059 A | | 12/1991 | Okada |
| 5,785,030 A | * | 7/1998 | Paas .................... 60/278 |
| 6,062,026 A | * | 5/2000 | Woollenweber et al. .... 60/605.2 |
| 6,321,538 B2 | * | 11/2001 | Hasler .................. 60/612 |
| 6,619,033 B2 | * | 9/2003 | Adler et al. ............. 60/280 |
| 6,684,863 B2 | * | 2/2004 | Dixon et al. ............ 123/565 |
| 6,863,058 B2 | * | 3/2005 | Kurtz et al. ............. 123/672 |
| 6,883,324 B2 | * | 4/2005 | Igarashi et al. .......... 60/608 |
| 6,922,995 B2 | * | 8/2005 | Kawamura et al. ........ 60/608 |

FOREIGN PATENT DOCUMENTS

EP 1336737 A2 2/2003

(Continued)

OTHER PUBLICATIONS

European Search Report dated Jul. 2, 2007.

(Continued)

*Primary Examiner*—Thomas Denion
*Assistant Examiner*—Douglas J. Duff
(74) *Attorney, Agent, or Firm*—Nixon & Vanderhye P.C.

(57) ABSTRACT

A control system for an internal combustion engine includes a turbocharger and a throttle valve. The turbocharger that is adapted to supercharging intake air drawn into the internal combustion engine utilizing energy of exhaust gas of the internal combustion engine. The turbocharger includes an electric generator that is adapted to generating regenerative electric power utilizing energy of exhaust gas. The throttle valve is adapted to controlling a flow amount of intake air supercharged using the turbocharger. An operating condition detecting unit is adapted to detecting an operating condition of at least one of the turbocharger and the electric generator. The throttle opening correcting unit is adapted to correcting opening degree of the throttle valve on the basis of the operating condition of the at least one of the turbocharger and the electric generator, when the electric generator regenerates regenerative electric power.

19 Claims, 5 Drawing Sheets

FOREIGN PATENT DOCUMENTS

| | | |
|---|---|---|
| FR | 2859499 | 9/2003 |
| JP | 01-117932 | 5/1989 |
| JP | 01 170721 | 7/1989 |
| JP | 04-12131 | 1/1992 |
| JP | 04-54218 | 2/1992 |
| JP | 3092206 | 7/2000 |
| JP | 2002-328861 | 11/2003 |
| JP | 2003-328861 | 11/2003 |
| JP | 2004-169673 | 6/2004 |

OTHER PUBLICATIONS

Examination report dated Nov. 23, 2007 from the EPO issued in corresponding European Application No. 06100784.5.

Office Action issued Oct. 21, 2008 in corresponding Japanese Application No. 2005-018161 w/ an at least partial English language translation thereof.

* cited by examiner

ENGINE CONTROL SYSTEM HAVING TURBOCHARGER

CROSS REFERENCE TO RELATED APPLICATIONS

This application is based on and incorporates herein by reference Japanese Patent Application No. 2005-18161 filed on Jan. 26, 2005.

FIELD OF THE INVENTION

The present invention relates to an engine control system having a turbocharger.

BACKGROUND OF THE INVENTION

Conventionally, an internal combustion engine has a supercharging device such as a turbocharger for supercharging intake air, which is drawn into a cylinder of the engine using a turbocharger, to increase output power of the engine or to reduce fuel cost. Here, the turbocharger has a turbine, which is rotated utilizing exhaust energy of the engine, thereby operating a compressor arranged coaxially with the turbine, so that the turbocharger supercharges the intake air. In this turbocharger, increase in supercharging pressure in a low rotation range of the engine may be insufficient, consequently, the actual supercharging pressure may decrease. As a result, charging efficiency may decrease, and enhancement in the engine output may become insufficient.

According to JP-A-1-117932 and JP-B2-P3092206, an electric motor is mounted to a shaft for connecting the turbine and the compressor, so that the insufficient amount of the actual supercharging pressure is supercharge-assisted by the electric motor in the low speed rotation range of the engine. An electrically operated generator is used as the electric motor. The actual supercharging pressure can be increased in a high speed rotation range of the engine, even when no supercharging assist is performed. Hence, regenerative electric power can be also generated in the electrically operated generator by rotating the electrically operated generator via the turbine and the shaft utilizing the exhaust energy of the engine.

However, in the above engine control system with the above supercharging device, the electric power regeneration using the electrically operated generator is performed in only the high speed rotation range of the engine. However, for example, high speed range may not be used in normal running in a high speed diesel engine for a passenger car. Therefore, in this method, it almost has no benefit of the electric power regeneration using the electrically operated generator. Namely, it almost has no benefit for enhancing fuel efficiency by improving efficiency, in comparison with the electric power generation of an alternator that serves as an engine auxiliary device rotated and operated by the engine.

Therefore, for example, it is conceived that the effect of the improvement in fuel efficiency can be also obtained by performing the electric power regeneration using the electrically operated generator in the low speed rotation range or a light load range. These low speed rotation range and light load range are in a normal range of the diesel engine for a passenger car. However, when the electric power regeneration is performed by rotating the electrically operated generator utilizing the exhaust energy in either the low speed rotation range or the light load range, a part of the exhaust energy is consumed in the electric power regeneration. Therefore, the supercharging effect may be correspondingly decreased, and the output shaft torque of the engine (engine torque) may be decreased.

Here, an exhaust gas recirculating device (EGR device) may be mounted for reducing highest combustion temperature by mixing a part of the exhaust gas of the engine into the intake air, thereby reducing a harmful substance (e.g., NOx) included in the exhaust gas, and improving an exhaust gas purifying performance. The EGR device has an exhaust gas return flow pipe (EGR pipe) for returning a part of the exhaust gas of the engine from an engine exhaust pipe into an engine intake pipe. The EGR device also has an exhaust gas return flow rate control valve (EGR control valve) for controlling an exhaust gas return flow rate (EGR rate), which represents a rate of exhaust gas flowing into this EGR pipe.

In recent years, a performance for treating exhaust gas needs to be further improved by flowing a large amount of exhaust gas recirculating gas (EGR gas), in the diesel engine. This EGR gas returns to the engine intake pipe through the EGR pipe. Therefore, an intake shutter becomes practically used for throttling an intake passage on the upstream side of a joining portion, in which the new intake air merges with the EGR gas, with respect to an airflow direction. That is, intake shutter is arranged on the side of the turbine of the turbocharger with respect to the joining portion in the intake passage. Thus, the flow rate (new intake air amount) of the intake air supercharged by the turbocharger, when the EGR control valve opens, can be reduced.

It is conceivable to combine the above EGR device and the intake shutter with the above engine control system having the supercharging device to construct a diesel engine control system having a turbocharger. When the opening degree of the EGR control valve is constant in the EGR device, it is generally known that as negative pressure in the intake pipe on the downstream side of the intake shutter with respect to the airflow direction decreases, the EGR flow rate increases and a performance for purifying the exhaust gas can be enhanced. Thus, the reducing effect of the harmful substance can be improved.

In this diesel engine control system having the turbocharger, when the electric power regeneration is performed by rotating the electrically operated generator utilizing the exhaust energy while the EGR control valve opens, the amount of electric power generated using the electrically operated generator increases as the rotation speed of the electrically operated generator or the turbocharger increases. Further, as the amount of electric power generated using the electrically operated generator increases, resistance arises in rotation of the turbine and the compressor of the turbocharger. This resistance becomes the resistance (load) of the intake air drawn from the compressor of the turbocharger into the cylinder of the engine, consequently, the amount of intake throttling increases and the intake pressure decreases. Thus, since the intake pipe pressure decreases, the exhaust gas of the engine easily returns to the engine intake pipe, even when the opening degree of the intake shutter is not corrected to the closing side. Therefore, the engine torque may decrease for an amount of this exhaust gas returning to the engine intake pipe.

SUMMARY OF THE INVENTION

In view of the foregoing and other problems, it is an object of the present invention to provide an engine control system having a turbocharger, the engine control system being capable of correcting reduction in the engine torque when electric power is regenerated using an electric generator.

According to one aspect of the present invention, a control system for an internal combustion engine includes a turbocharger, a throttle valve, an operating condition detecting unit, and a throttle opening correcting unit. The turbocharger is adapted to supercharging intake air drawn into the internal combustion engine utilizing energy of exhaust gas of the internal combustion engine. The turbocharger includes an electric generator being adapted to generating regenerative electric power utilizing energy of exhaust gas. The throttle valve is adapted to controlling a flow amount of intake air supercharged using the turbocharger. The operating condition detecting unit is adapted to detecting an operating condition of at least one of the turbocharger and the electric generator. The throttle opening correcting unit is adapted to correcting opening degree of the throttle valve on the basis of the operating condition of the at least one of the turbocharger and the electric generator, when the electric generator regenerates regenerative electric power.

Alternatively, a control system is adapted to an internal combustion engine that connects with an intake pipe and an exhaust pipe. The control system includes a turbocharger, a throttle valve, and a control unit. The turbocharger includes a compressor, a turbine, and an electric generator. The compressor is rotatably accommodated in the intake pipe. The turbine is rotatably accommodated in the exhaust pipe. The electric generator is arranged between the compressor and the turbine. The throttle valve is rotatably accommodated in the intake pipe downstream of the compressor. The control unit is adapted to control the throttle valve for throttling the intake pipe. The control unit controls the throttle valve to an opening side when the electric generator regenerates regenerative electric power utilizing energy of exhaust gas using the turbine.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
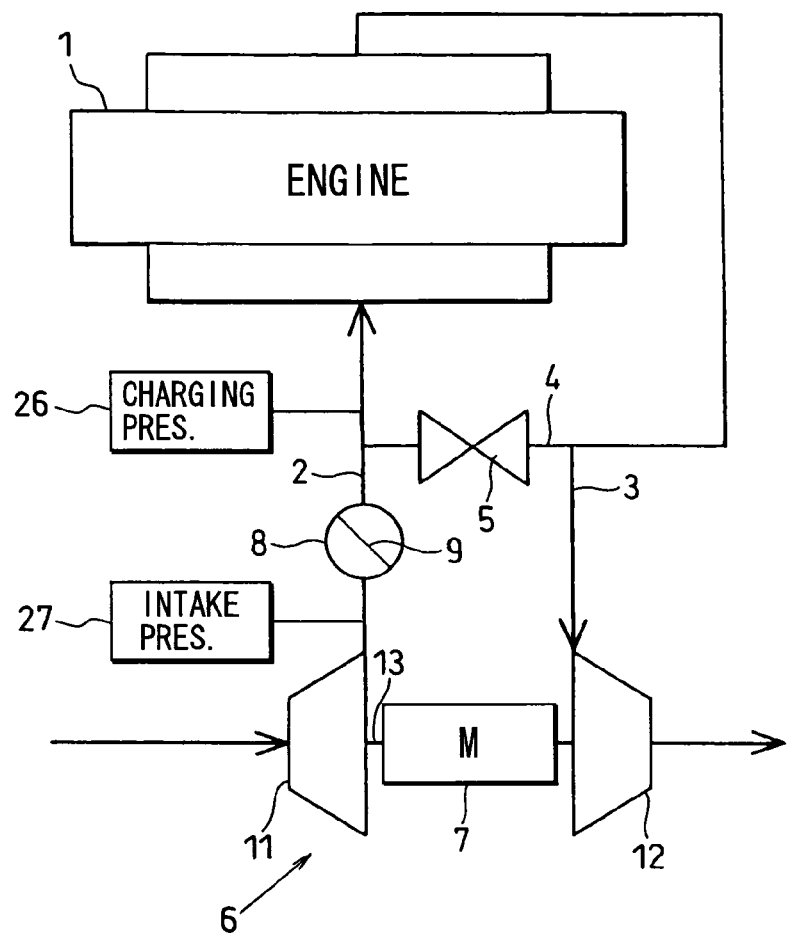
FIG. 1 is a schematic view showing an engine with a turbocharger, according to a first embodiment of the present invention.

As shown in FIGS. 1 to 5, an engine control system has an engine intake pipe 2 and an engine exhaust pipe 3. The engine intake pipe 2 and the engine exhaust pipe 3 communicate with each cylinder of the internal combustion engine 1, such as a diesel engine, mounted to a vehicle such as an automobile. The engine control system with the turbocharger also has an exhaust gas recirculating device (EGR device) for controlling the opening degree of an exhaust gas return flow rate control valve (EGR control valve) 5. The engine control system also has an electrically operated generator (electric generator, assist motor) 7 for performing supercharging assist by rotating and operating the turbocharger (charging device) 6. The engine control system also has an electronic throttle controller for controlling the opening degree of a throttle valve (intake throttle) 9. The engine control system further has an engine control unit (ECU, control unit) 10 for controlling the operation of each of these systems in association with each other.

The engine 1 may be a direct injection diesel engine, in which fuel is directly injected and supplied into a combustion chamber. An unillustrated intake valve for opening and closing an intake port, and an unillustrated exhaust valve for opening and closing an exhaust port are provided to this engine 1. The intake port of the engine 1 is constructed so as to supply intake air via an intake passage formed in the engine intake pipe 2 including an intake manifold. The exhaust port of the engine 1 is constructed so as to discharge exhaust gas to an exhaust passage formed in the engine exhaust pipe 3 including an exhaust manifold.

Here, an unillustrated common rail type fuel injector is arranged in the engine control system with the turbocharger in this embodiment. This common fuel injector is used for injecting and supplying high pressure fuel into the combustion chamber of each cylinder of the engine 1. The fuel injector has a supply pump (fuel injection pump: not shown) for pressurizing fuel drawn into a pressurizing chamber and setting the fuel pressure at high pressure. The fuel injector also has an unillustrated common rail for accumulating pressure of the high pressure fuel discharged out of this supply pump. The common rail type fuel injector further has multiple injectors (INJ: not shown) for injecting and supplying the high pressure fuel accumulated in the common rail into the combustion chamber of each cylinder of the engine 1. An unillustrated actuator of an electromagnetic valve, and the like for operating a nozzle needle (valve body) in an opening direction is arranged in the multiple injectors. Further, an unillustrated actuator of an intake amount adjusting valve (SCV) and the like are arranged in the supply pump. This actuator is used for controlling an amount of fuel discharged from the supply pump by adjusting a fuel intake amount drawn into the pressurizing chamber.

The EGR device has an exhaust gas return flow pipe (EGR pipe) 4 for partially introducing exhaust gas, which flows into the exhaust passage of the engine exhaust pipe 3, into the intake passage of the engine intake pipe 2. The EGR device also has the EGR control valve 5 for variably changing a return flow rate (EGR amount) of the exhaust gas (exhaust recirculating gas: EGR gas) flowing into an exhaust gas return flow path (EGR path) in this EGR pipe 4. In this embodiment, the upstream end of the EGR pipe 4 with respect to the airflow direction thereof is connected with the engine exhaust pipe 3 for communicating the exhaust port of the engine 1 with a turbine 12 of the turbocharger 6. The downstream end of the EGR pipe 4 with respect to the airflow direction thereof is connected with the engine intake pipe 2, which communicates a throttle body 8 with the intake port of the engine 1.

The EGR control valve 5 has a valve (valve body) for changing an exhaust gas circulating area of the EGR path in the EGR pipe 4, and variably changing the EGR ratio for mixing the EGR gas, which is a part of the exhaust gas of the engine 1, into the intake air. The EGR ratio represents a rate of the EGR amount with respect to a new intake air amount. The EGR control valve 5 also has an actuator of an electromagnetic valve, a drive motor, or the like for operating the EGR control valve 5 in a direction, in which the EGR control valve 5 opens. The EGR control valve 5 further has a valve biasing unit such as a spring for biasing the valve in a direction, in which the EGR control valve 5 closes. The flow amount (EGR amount) of the EGR gas flowing into the EGR path in the EGR pipe 4 is controlled by adjusting the opening degree of the EGR control valve 5 and the opening degree of the intake throttle 9.

The turbocharger 6 has a compressor 11 arranged in an intermediate portion of the engine intake pipe 2, and also has the turbine 12 arranged in an intermediate portion of the engine exhaust pipe 3. A rotor shaft 13 is assembled between the compressor 11 and the turbine 12. Here, an intercooler may be also arranged in an intermediate portion of the engine intake pipe 2. The intercooler may be an air cooling type intercooler or a water cooling type intercooler. The intercooler is used for cooling the new intake air compressed (supercharged) and raised in temperature by the compressor 11 of the turbocharger 6. In addition, a filtering element (air filter) for catching foreign matters in the intake air is accommodated in an unillustrated air cleaner case arranged on the uppermost stream side of the engine intake pipe 2.

The compressor 11 is attached to one end portion of the rotor shaft 13 in the axial direction thereof. The compressor 11 has a compressor wheel having multiple compressor blades. This compressor wheel is rotatably accommodated in a compressor housing so as to supercharge the intake air flowing into the engine intake pipe 2. An intake air supply path formed in the compressor housing is in a spiral shape along the rotative direction of this compressor wheel so as to surround the outer circumference of the compressor wheel.

The turbine 12 is mounted to the axial other end portion of the rotor shaft 13, and has a turbine wheel having multiple turbine blades. This turbine wheel is rotatably accommodated in a turbine housing so as to be rotated by exhaust gas flowing into the engine exhaust pipe 3. An exhaust gas discharge path in the turbine housing is formed in a spiral shape along the rotative direction of this turbine wheel so as to surround the outer circumference of the turbine wheel. An electrically operated generator 7 is attached to the axial central portion of the rotor shaft 13 between the compressor 11 and the turbine 12 in this embodiment.

The electrically operated generator 7 is an assist motor having an operation as an electric motor for performing supercharging assist by rotating the rotor shaft 13 for operating the compressor 11 and the turbine 12. The electrically operated generator 7 also has an operation as an electric generator for generating regenerative electric power by operating this electrically operated generator 7 utilizing exhaust energy. This electrically operated generator 7 is an alternating current (AC) motor of a three-phase induction electrically operated generator and the like. The electrically operated generator 7 is constructed of a rotor, which is integrated with the rotor shaft 13, and a stator oppositely arranged on the outer circumferential side of this rotor. A rotor core having a permanent magnet is arranged in the rotor. A stator core, which is wound with stator coils of three phases therearound, is arranged in the stator. The electrically operated generator 7 serves as the electric motor when the supercharging assist is required. At this time, the electrically operated generator 7 is electrically connected with the ECU 10 through an electrically operated generator control circuit. Further, the electrically operated generator 7 serves as the electric generator when no supercharging assist is required. At this time, the electrically operated generator 7 is electrically connected with a battery 18 and other electric devices mounted to a vehicle through the electrically operated generator control circuit.

Figure 3:
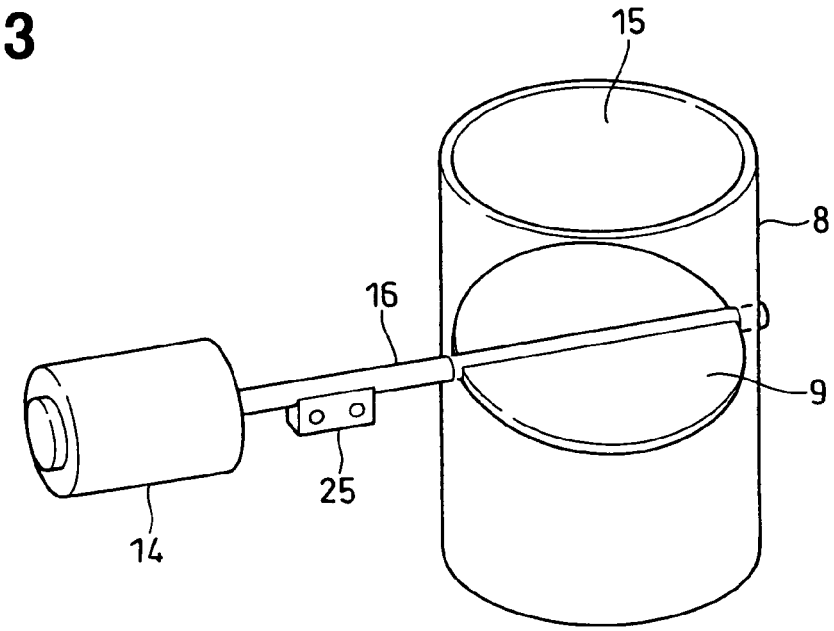
FIG. 3 is a perspective view showing an intake throttle and an electronic controller of the intake throttle, according to the first embodiment.

The schematic construction of an electronic throttle controller of this embodiment will next be explained on the basis of FIGS. 1 to 3.

This electronic throttle valve has the throttle body 8, which is integrated with the engine intake pipe 2, and also has the intake throttle 9 for adjusting an amount of the new intake air drawn into the combustion chamber of each cylinder of the engine 1. The electronic throttle controller also has an electric motor (DC motor) 14, which serves as an actuator for operating this intake throttle 9 in a closing direction, in which the intake throttle 9 closes, and further has the above ECU 10 for electronically controlling the operation of this DC motor 14.

The throttle body 8 has a throttle bore (intake passage) 15 in a circular shape in cross section, and the intake throttle 9 is accommodated therein to be freely opened and closed. An unillustrated valve biasing unit such as a default spring for biasing the intake throttle 9 in an opening direction is arranged in the throttle body 8. This default spring serves as a full open position holding unit for mechanically holding the intake throttle 9 at a throttle opening degree corresponding to a valve full open position when electric supply to the DC motor 14 is stopped.

The intake throttle 9 is a butterfly valve approximately formed in a disk shape, and has a shaft 16 arranged along the rotation axis. The intake throttle 9 in this embodiment is fastened and fixed to the shaft 16 using a screw, and the like in a state inserted into a valve insertion hole formed in the shaft 16. The shaft 16 has a valve holding portion for holding the intake throttle 9. Both sides of the valve holding portion of this shaft 16 are rotatably supported in a shaft bearing portion of the throttle body 8. The opening degree (intake throttle opening degree) of the intake throttle 9 is controlled by turning-on the DC motor 14 in a valve operating range from a full closing position to a full opening position using driving force of the DC motor 14.

Further, in this embodiment, when the intake throttle 9 is stopped in the full closing position (see FIG. 3), the new intake air can be interrupted, so that engine vibration, when the engine 1 stops, can be reduced. Further, in this embodiment, the intake throttle opening degree is controlled by the driving force of the DC motor 14 even in an idling operation. Thus, the new intake air amount is controlled, so that the engine rotation speed is controlled such that the engine rotation speed coincides with a target idle rotation speed. In this embodiment, when the electric supply to the DC motor 14 stops, the intake throttle 9 is returned to the full opening position by the biasing force of the default spring, and the intake throttle opening degree attains the full opening state.

The DC motor 14 is a brushless DC motor constructed of a rotor, which is integrated with an output shaft (motor shaft), and a stator oppositely arranged on the outer circumferential side of this rotor. A rotor core having a permanent magnet is arranged in the rotor. A stator core wound with an armature coil (armature winding wire) therearound is arranged in the stator. A gear speed reduction mechanism may be also arranged between an output shaft of the DC motor 14 and the shaft 16 of the intake throttle 9 for reducing the rotation speed of the output shaft of the DC motor 14 so as to become a predetermined speed reduction ratio. Further, a direct current (DC) motor with a brush, an alternating current (AC) motor such as a three-phase induction electric motor, and the like may be also provided instead of the brushless DC motor.

Figure 2:
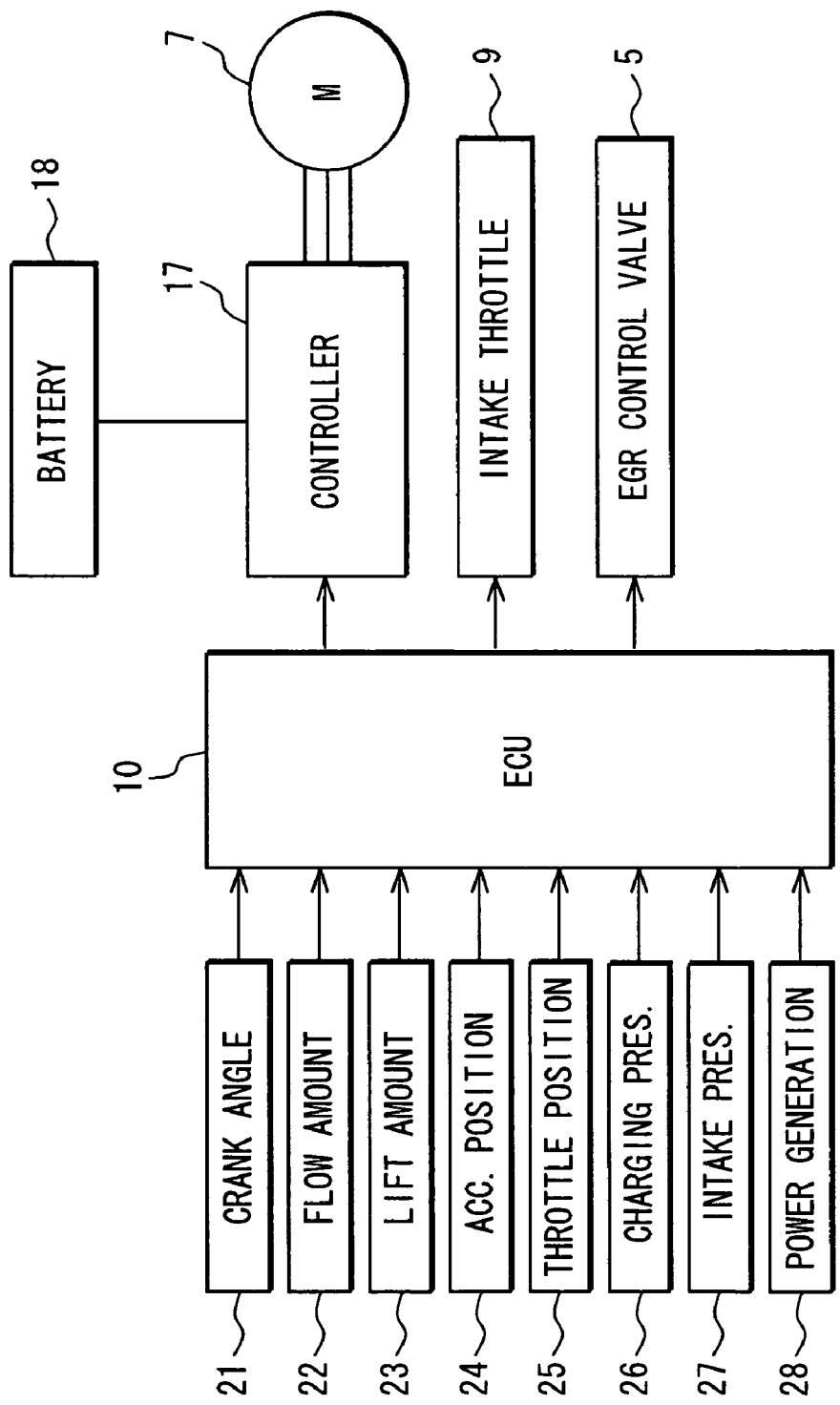
FIG. 2 is a schematic view showing a control system of the engine with the turbocharger, according to the first embodiment.

Here, as shown in FIG. 2, a micro computer of a publicly known structure is provided to the ECU 10. This micro computer includes a CPU, a memory device, an input circuit, an output circuit, an electric power circuit, and the like, for example. The CPU performs control processing and arithmetic processing. The memory device may include a volatile memory such as SRAM and DRAM, and a nonvolatile memory such as EPROM, EEPROM and a flash memory for storing a control program, a control logic, and data. The ECU 10 is constructed so as to feedback-control the fuel pressure (common rail pressure) in the common rail, the exhaust gas return flow rate (EGR amount), the actual supercharging pressure (intake pressure), the new intake air amount, and the like to become respective control command values on the basis of the control program and the control logic. The control program and the control logic are accommodated in the memory when an ignition switch is turned on (IG•ON).

Further, a pump driving circuit, an injector driving circuit, and an EGR driving circuit are arranged between the ECU 10 and the actuator of each system. The pump driving circuit applies an SCV driving electric current to an intake amount adjusting valve of the supply pump. The injector driving circuit applies an INJ driving electric current to an electromagnetic valve of an injector. The EGR driving circuit applies an EGR driving electric current to the actuator of the EGR control valve 5. A motor driving circuit, which is for applying a motor driving electric current to the DC motor 14, is arranged between the ECU 10 and the DC motor 14 of the intake throttle 9. An electrically operated generator control circuit 17 serving as a controller (electric power converting portion) is arranged between the ECU 10 and the electrically operated generator 7 of the turbocharger 6.

The electrically operated generator control circuit 17 is constructed of a DC-DC converter, an inverter, a rectifying circuit, and the like. The DC-DC converter is for raising a direct current voltage from that of the battery 18. The inverter is for converting the raised direct current voltage into an alternating current voltage of a variable frequency and operating the electrically operated generator 7. The rectifying circuit is for rectifying an alternating current output generated in accordance with the electric power regeneration using the electrically operated generator 7. The DC-DC converter can also produce a stable battery voltage by lowering and then smoothing the direct current voltage output from the rectifying circuit. The inverter is a rotation speed control unit for controlling the rotation speed of the rotor shaft 13 of the electrically operated generator 7 by variably changing the alternating electric current. Specifically, the inverter varies an output electric current (driving electric current) applied to the stator coils of three phases of the electrically operated generator 7, on the basis of a command driving electric current value transmitted from the ECU 10.

The rectifying circuit rectifies and converts the alternating electric current, which is output from the stator coils of three phases of the electrically operated generator 7, into a direct electric current. The DC-DC converter and the rectifying circuit construct an output voltage adjuster for rectifying the alternating current generated through the electric power regeneration using the electrically operated generator 7. In addition, the output voltage adjuster is for lowering this alternating current to a predetermined voltage, and charging this current to the battery 18. The electrically operated generator control circuit 17 has an operation for calculating the rotation speed of the rotor shaft 13 of the turbocharger 6 or the electrically operated generator 7. The electrically operated generator control circuit 17 calculates the rotation speed of the rotor shaft 13 on the basis of the driving electric current value, which is the electric current output from the inverter, and applied to the stator coils of three phases of the electrically operated generator 7. A rotation speed sensor may be also arranged for converting the rotation speed of the rotor shaft 13 of the turbocharger 6 or the electrically operated generator 7 into an electric signal, so that the rotation speed sensor outputs this electric signal.

The ECU 10 inputs various kinds of signals from sensor such as a crank angle sensor 21, which is for detecting a crank shaft rotation angle of the engine 1, an air flow meter 22, which is for detecting the intake air amount of the engine 1, and a lift amount sensor 23, which is for converting a lift amount of the EGR control valve 5 into a valve lift amount signal. These signals are A/D-converted using an A/D converter, and are input to the micro computer built in the ECU 10. The crank angle sensor 21 is constructed of a pickup coil for converting the rotation angle of the crank shaft of the engine 1 into an electric signal. For example, an NE pulse signal is output from the crank angle sensor 21 at every 30° CA (crank angle). The ECU 10 serves as a rotation speed detecting unit for detecting the engine rotation speed NE by measuring an interval time of the NE pulse signal output from the crank angle sensor 21.

An accelerator position sensor 24 is connected with the ECU 10. This accelerator position sensor 24 converts an accelerator position operated by a driver into an accelerator position signal, and outputs a degree, for which the accelerator pedal is stepped-in to the ECU 10. The accelerator position is a stepping amount of an accelerator pedal. Further, an intake throttle opening degree sensor (throttle position sensor) 25 is connected with the ECU 10. This throttle position sensor 25 converts an intake throttle opening degree into a throttle position signal, and outputs a degree, for which the intake throttle 9 opens, to the ECU 10. The above signals such as the accelerator position signal and the throttle position signal, which are output from the accelerator position sensor 24 and the throttle position sensor 25, are A/D-converted using the A/D converter and are then input to the micro computer, similarly to other sensors.

As referred to FIGS. 1, 2, a supercharging pressure sensor 26 and an intake pressure sensor 27 are connected with the ECU 10. The supercharging pressure sensor 26 is for detecting the supercharging pressure of the intake air supercharged by the turbocharger 6. The intake pressure sensor 27 is for detecting a variation in intake pipe pressure. Similarly to other sensors, electric signals (sensor signals) output from these supercharging pressure sensor 26 and the intake pressure sensor 27 are A/D-converted using the A/D-converter, and are input to the micro computer. The supercharging pressure sensor 26 converts the intake pressure, which is the supercharging pressure, into an electric signal, and outputs this electric signal. This intake pressure is pressure in the engine intake pipe 2 on the downstream side, which is on the side of the intake port of the engine 1, of a joining portion with respect to the airflow direction. This joining portion is located at a point, in which the EGR gas flow flowing into the EGR path in the EGR pipe 4 merges with the new intake air flow flowing out of the throttle bore 15 of the throttle body 8. The intake pressure sensor 27 converts the intake pipe pressure (turbo downstream intake pressure, intake pressure immediately after turbo), which is in the engine intake pipe 2 between the compressor 11 of the turbocharger 6 and the throttle bore 15 of the throttle body 8, into an electric signal. The intake pressure sensor 27 outputs this electric signal of the turbo downstream intake pressure.

The ECU 10 has an operation (injection amount setting unit) for calculating a target injection amount (command injection amount: QFIN) by adding an injection amount correcting value to a basic injection amount (Q). The injection amount correcting value is determined in consideration of fuel temperature, engine cooling water temperature, and the like. The basic injection amount (Q) is set correspondingly to the engine rotation speed (NE) and the accelerator position (ACCP). The ECU 10 also has an operation (injection period setting unit) for calculating a command injection period (TFIN) in accordance with the engine rotation speed (NE) and the command injection amount (QFIN). The ECU 10 further has an operation (injection period setting unit) for calculating an injection command pulse length (command injection period: TQFIN). This injection command pulse length serves as an injection amount command value that corresponds to an electric current conducting time with respect to the electromagnetic valve of an injector. The injection amount command value is calculated in accordance with the command injection amount (QFIN) and the fuel pressure (common rail pressure: PC) in the common rail detected using an unillustrated fuel pressure sensor arranged in the common rail.

Further, the ECU 10 has a fuel pressure control unit for arithmetically calculating an optimum injection pressure of the fuel in accordance with an operating state of the engine 1, and for operating the intake amount adjusting valve of the supply pump through the pump driving circuit. This fuel pressure control unit has an operation (fuel pressure setting unit) for calculating a target fuel pressure (PFIN) in accordance with the command injection amount (QFIN) and the engine rotation speed (NE). The fuel pressure control unit feedback-controls a fuel discharging amount discharged out of the supply pump by adjusting a pump driving electric current applied to the intake amount adjusting valve, thereby producing the target fuel pressure (PFIN).

Figure 4:
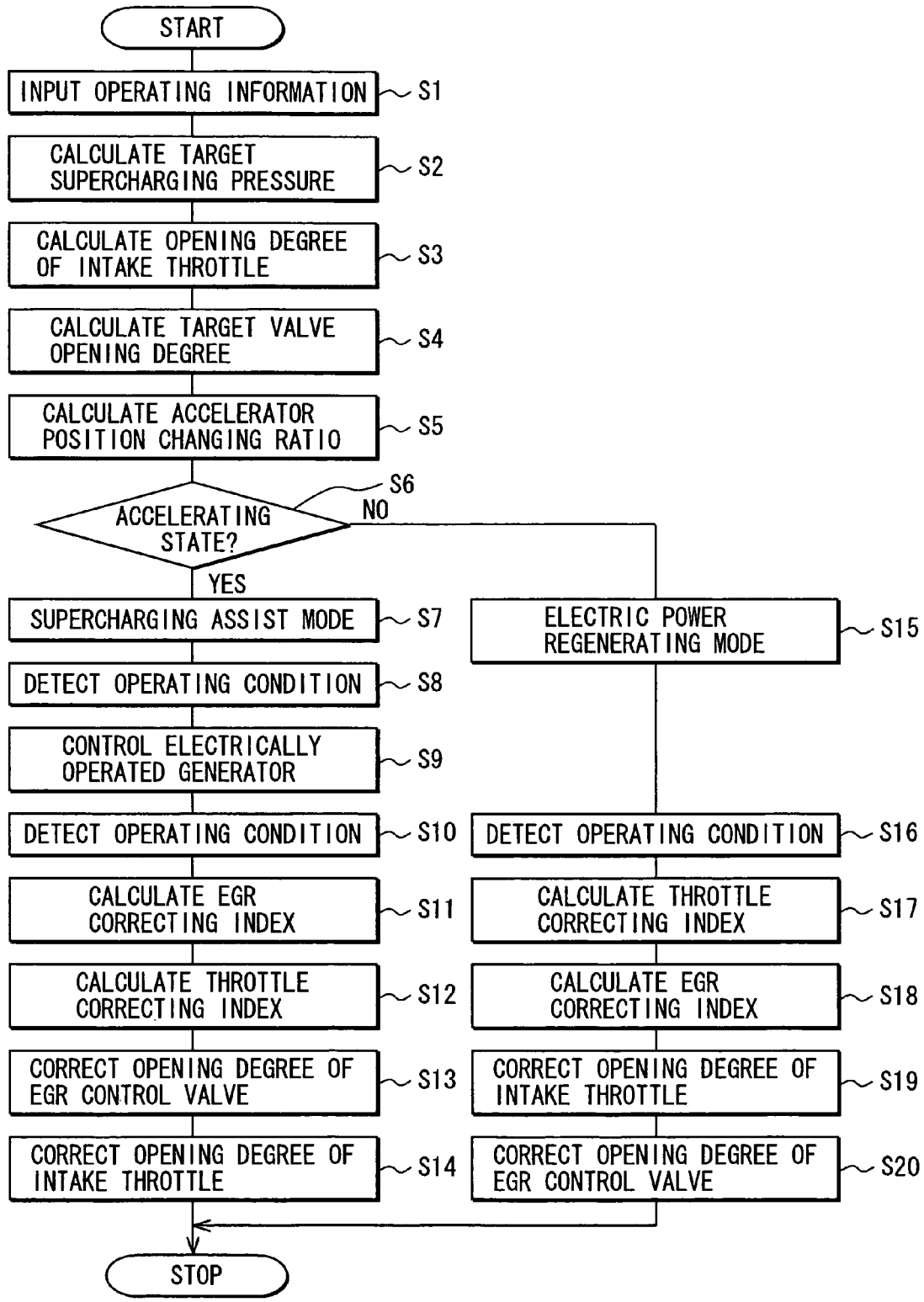
FIG. 4 is a flow chart showing a control process of an electrically operated generator of the turbocharger, the intake throttle, and an EGR control valve, according to the first embodiment.

A control method of the engine control system with the turbocharger of this embodiment will next be explained in reference with FIGS. 1 to 5. The control routine shown in FIG. 4 is repeated at every predetermined interval after the ignition switch is turned on, for example.

First, in step S1, various kinds of sensor signals, information of the engine operation, and operating information of each system are input for determining the operating state of the engine 1. Specifically, the engine rotation speed NE, the accelerator position, the new intake air amount, the command injection amount, the target fuel pressure, and the like are read.

Next, in step S2, a target supercharging pressure is calculated from the engine rotation speed NE and the command injection amount or the accelerator position, for example. This target supercharging pressure may be also read from a data map defined by measuring relations by an experiment and the like, in advance. Here, the engine rotation speed NE is detected by measuring the interval time of an NE pulse signal output from the crank angle sensor 21. Further, the command injection amount is calculated by adding the injection amount correcting value to the basic injection amount. The injection amount correcting value is determined in consideration of fuel temperature, engine cooling water temperature, and the like. The basic injection amount is set correspondingly to the engine rotation speed NE and the accelerator position.

Next, in step S3, a control target value (target throttle opening degree, intake throttle opening degree) is calculated from the engine rotation speed NE and the command injection amount. This intake throttle opening degree may be also read from a data map defined by measuring relations by an experiment, and the like, in advance. In this embodiment, the intake throttle opening degree is read from an intake throttle opening degree data map shown in FIG. 5. This intake throttle opening degree data map is stored in a memory of the ECU 10, for example. Next, in step S4, the control target value (target valve opening degree) is calculated from the operating state of the engine 1. For example, this target valve opening degree is set in accordance with the deviation between the actual new intake air amount detected using the air flow meter 22 and a target new intake air amount set correspondingly to the operating state of the engine 1.

Next, in step S5, an accelerator position changing ratio is calculated from the accelerator position. Here, the accelerator position changing ratio is calculated from a changing amount (accelerator position changing amount) per unit time of the accelerator position detected using the accelerator position sensor 24. Next, in step S6, it is evaluated whether it is in an accelerating state or a stationary state for evaluating whether supercharging assist is required or not. Specifically, it is evaluated whether the accelerator position changing ratio is equal to or greater than a predetermined value. Step S6 serves as a supercharging assist determining unit.

When a positive determination is made in this step S6, it is determined to be in the accelerating state requiring the supercharging assist. Accordingly, in step S7, it is switched to be in a supercharging assist mode for rotating and operating the compressor 11 and the turbine 12 of the turbocharger 6 by the electrically operated generator 7. Step S7 serves as a mode switching unit. In step S8, an operating condition of the turbocharger 6 is read in this supercharging assist mode. Specifically, an electric signal output from the supercharging pressure sensor 26 is input, so that the actual supercharging pressure is detected. Step S8 serves as an operating condition detecting unit.

Next, a target rotation speed is calculated from the deviation between the actual supercharging pressure detected using the supercharging pressure sensor 26 and the target supercharging pressure set correspondingly to the operating state of the engine 1. Next, in step S9, the driving electric current, which is output from an inverter to be corresponding to electric current applied to the stator coils of three phases of the electrically operated generator 7, is controlled such that the actual rotation speed of the electrically operated generator 7 approximately coincides with the target rotation speed. Thus, as the actual supercharging pressure decreases from the target supercharging pressure, the rotation speed of the electrically operated generator 7 is accelerated. Therefore, even when the engine rotation speed NE is in a low rotation range, the actual supercharging pressure approximately coincides with the target supercharging pressure by supercharge-assisting an insufficient amount of the actual supercharging pressure using the electrically operated generator 7. Thus, charging efficiency is enhanced, so that an engine output is enhanced.

Next, in step S10, the operating condition of the turbocharger 6 is read. Specifically, an electric signal output from the supercharging pressure sensor 26 is input, so that the actual supercharging pressure is detected. Alternatively, the driving electric current, which is output from the inverter, is read. The driving electric current corresponds to electric current applied to the stator coils of three phases of the electrically operated generator 7. Step S10 serves as an operating condition detecting unit. Next, in step S11, an EGR valve opening degree correcting index (EGR correcting index) of the EGR control valve 5 is calculated on the basis of the actual supercharging pressure, which is detected using the supercharging pressure sensor 26, or the output electric current value of the inverter. This EGR correcting index may be also read from a data map defined by measuring relations by an experiment, and the like, in advance. Step S11 serves as an EGR rate correcting unit.

Next, in step S12, an intake throttle opening degree correcting index (throttle correcting index) of the intake throttle 9 is calculated on the basis of one of the actual supercharging pressure and the output electric current value of the inverter. The actual supercharging pressure is detected using the supercharging pressure sensor 26. This throttle correcting index may be also read from a data map defined by measuring relations by an experiment, and the like, in advance. Next, in step S13, the opening degree of the EGR control valve 5 is further corrected to one of the opening side and the closing side for the amount of the calculated EGR correcting index. Next, in step S14, the opening degree of the intake throttle 9 is further corrected to one of the closing side and the opening side for the amount of the calculated throttle correcting index. Thereafter, the control routine of FIG. 4 terminates.

Here, in the supercharging assist mode, as the driving electric current, which is output from the inverter, increases, the supercharging pressure increases. This driving electric current corresponds to electric current applied to the stator coils of three phases of the electrically operated generator 7. Accordingly, the intake pressure increases and it becomes difficult to return the flow of the exhaust gas through the EGR path. Therefore, as the electric current output from the inverter increases, the opening degree of the EGR control valve 5 is corrected to the side, on which the EGR control valve 5 further opens, and the opening degree of the intake throttle 9 is corrected to the smaller closing side. Thus, the EGR amount tending to be insufficient is corrected, and a harmful substance such as NOx included in the exhaust gas can be reduced. When a reduction in engine torque is caused due to correcting the opening degree of the EGR control valve 5 to the opening side in the supercharging assist mode, the opening degree of the intake throttle 9 may be corrected to the opening side and the command injection amount may be increased on the basis of the EGR correcting index, for example.

By contrast, when a negative determination is made in the step S6, it is determined to be in one of the stationary state and the decelerating state requiring no supercharging assist. Accordingly, in step S15, it is switched to an electric power regenerating mode for rotating the electrically operated generator 7 using the turbocharger 6. Step S15 serves as a mode switching unit. In this electric power regenerating mode, the turbocharger 6 serves as a turbo charger utilizing the normal exhaust energy. In step S16, the operating condition of one of the turbocharger 6 and the electrically operated generator 7 is read to correct an amount of increase in an intake throttling amount or an amount of reduction in the engine torque changing corresponding to the electric power regeneration using the electrically operated generator 7. Specifically, an electric signal output from the intake pressure sensor 27 is input, so that the turbo downstream intake pressure is detected, or the rotation speed of one of the turbocharger 6 and the electrically operated generator 7 is detected. Step S16 serves as an operating condition detecting unit and an intake pressure detecting unit.

Next, in step S17, the throttle correcting index of the intake throttle 9 is calculated on the basis of one of the turbo downstream intake pressure and the rotation speed of one of the turbocharger 6 and the electrically operated generator 7. The turbo downstream intake pressure is detected using the intake pressure sensor 27. Step S17 serves as a throttle opening correcting unit. This throttle correcting index may be also read from a data map defined by measuring relations by an experiment, and the like, in advance. In this embodiment, the throttle correcting index is read from the intake throttle opening degree data map, shown in FIG. 5, stored in a memory of the ECU 10, for example.

Next, in step S18, an EGR correcting index of the EGR control valve 5 is calculated on the basis of the throttle correcting index. This EGR correcting index may be also read from a data map defined by measuring relations by an experiment, and the like, in advance. Next, in step S19, the opening degree of the intake throttle 9 is further corrected to one of the opening side and the closing side for the amount of the calculated throttle correcting index. Subsequently, in step S20, the opening degree of the EGR control valve 5 is further corrected to one of the opening side and the closing side for the amount of the calculated EGR correcting index. Thereafter, the control routine of FIG. 4 is terminated.

Figure 5:
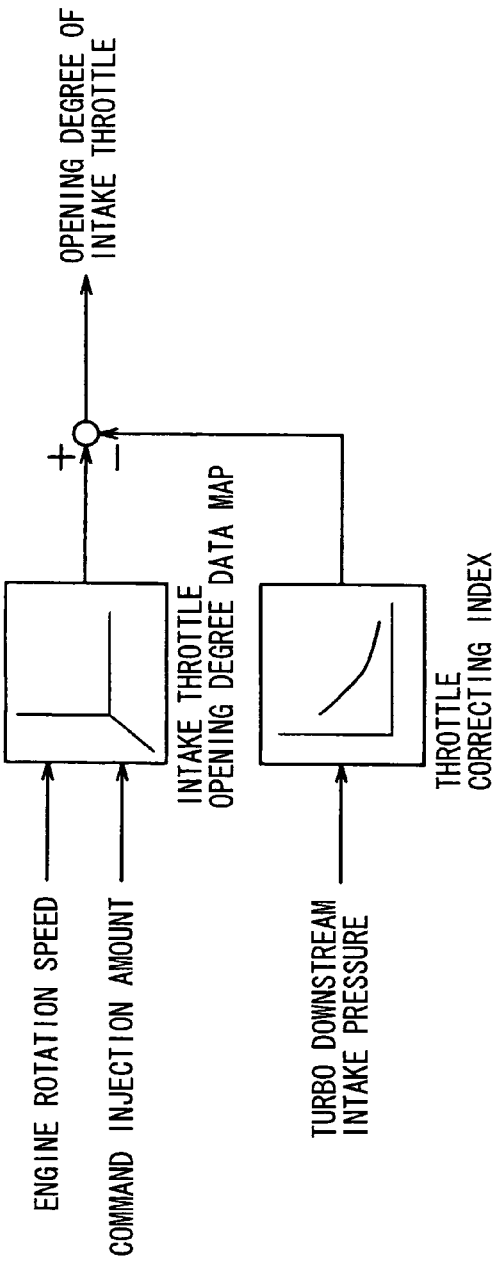
FIG. 5 is a block diagram showing a control logic of an opening degree of the intake throttle, according to the first embodiment.

Here, as shown in FIG. 5, the throttle correcting index is calculated in accordance with this control logic when the turbo downstream intake pressure is directly measured. This control logic shown in FIG. 5 is repeated at predetermined regular intervals after the ignition switch is turned on, for example. The fuel injection amount (command injection amount), which corresponds to an mount of fuel injected and supplied into the combustion chamber of each cylinder of the engine 1, may be individually arithmetically calculated for each cylinder of the engine 1.

In the electric power regenerating mode, as the amount of electric power generated using the electrically operated generator 7 increases, resistance arises in rotation of the compressor 11 and the turbine 12. This resistance in rotation of the compressor 11 causes load in the intake air drawn from the compressor 11 into the combustion chamber of the cylinder of the engine 1. As a result, the intake pressure on the downstream side of the compressor 11 of the turbocharger 6 is reduced with respect to the airflow direction. In this case, even when the opening degree of the intake throttle 9 is constant, intake pipe negative pressure on the downstream side of the intake throttle 9 with respect to the airflow direction increases. That is, pressure in the intake pipe on the downstream side of the intake throttle 9 further decreases to the negative side. Thus, when the EGR control valve 5 constantly opens in the electric power regenerating mode, the exhaust gas of the engine 1 easily returns to the engine intake pipe 2. Therefore, the new intake air amount may be reduced, and consequently, the engine torque may be reduced for the amount of this exhaust gas returning to the engine intake pipe 2.

Therefore, the throttle correcting index in consideration of the turbo downstream intake pressure is added to or subtracted from a base value of the intake throttle opening degree calculated from the engine rotation speed NE and the command injection amount. Specifically, as the turbo downstream intake pressure decreases, the opening degree of the intake throttle 9 is further corrected to the opening side, and the new intake air amount, which is apt to become small, is corrected to be an appropriate value.

Further, when the opening degree of the intake throttle 9 is corrected to the opening side, the intake pressure may increase and it may become difficult to return the flow of the exhaust gas through the EGR path. Therefore, as the throttle correcting index becomes a larger value, the EGR control valve 5 is further corrected to the opening side. Conversely, when the EGR rate is greater than the appropriate value even when the opening degree of the intake throttle 9 is corrected to the opening side, the EGR control valve 5 is further corrected to the closing side as the throttle correcting index becomes a larger value. Thus, the EGR rate tending to increase is appropriately corrected.

Here, a frequency of using the turbocharger 6 in the electric power regenerating mode increases, so that a benefit of the electric power regeneration using the turbocharger 6 can be easily produced. Namely, the benefit of improving fuel efficiency by efficiently generating electric power can be easily produced in comparison with the electric power generation using an alternator. When a passenger car is in a low speed rotation range or in a low load range, the passenger car is in a normal condition. Even in this normal condition, it is conceivable to use the turbocharger 6 in the electric power regenerating mode in a condition where the electric power regeneration is allowed in the stationary state requiring no supercharging assist, for example.

Further, the intake throttling amount is controlled at an appropriate value by generally adjusting the opening degree of the intake throttle 9 correspondingly to the operating state of the engine 1. In this case, when the electric power regeneration is performed using the electrically operated generator 7, the electrically operated generator 7 is rotated using the turbocharger 6. Accordingly, it causes resistance (load) in the intake air drawn from the compressor 11 of the turbocharger 6 into the combustion chamber of the cylinder of the engine 1. Therefore, the electric power regeneration using the electrically operated generator 7 has an intake throttling effect, which is equivalent to the intake throttling effect of the intake throttling valve. For example, as the rotation speed of one of the electrically operated generator 7 and the turbocharger 6 increases, the amount of electric power generated using the electrically operated generator 7 increases. Further, as the amount of electric power generated using the electrically operated generator 7 increases, the intake throttling amount increases, and the intake pressure, particularly the turbo downstream intake pressure, decreases.

Accordingly, as the rotation speed of one of the electrically operated generator 7 and the turbocharger 6 increases, so that the amount of electric power generated using the electrically operated generator 7 increases, the intake throttling amount increases, and the intake pressure decreases. Therefore, the amount of intake air drawn into the combustion chamber of the cylinder of the engine 1 may decrease, and the engine torque may decrease due to the increase in the intake throttling amount or the decrease in the intake pressure. Thus, it causes an obstacle in further producing the effect of improvement in fuel efficiency due to increasing the frequency of performing the electric power regeneration in the normal range of the engine 1 such as the low speed rotation range and the light load range, as well as the high speed rotation range of the engine 1.

For example, in a diesel engine for a passenger car, the intake throttling is performed by correcting the opening degree of an intake shutter to the closing side so as to increase the EGR rate in either the low speed rotation range or the light load range. Therefore, when the turbocharger 6 is used in the electric power regenerating mode in the condition of either the low speed rotation range or the light load range of the engine 1, the intake throttling amount may increase and the intake pressure may decrease. Therefore, it may become quite difficult to accomplish both the improvement in exhaust gas purifying performance and the improvement in the engine torque.

Here, it is conceivable that the intake throttling amount is divided into the intake throttling amount using the electrically operated generator 7 and the intake throttling amount using the intake throttle 9. in this case, the intake throttling amount using the electrically operated generator 7 can be estimated on the basis of the turbo downstream intake pressure detected using the intake pressure sensor 27. Therefore, the throttle correcting index can be calculated on the basis of the turbo downstream intake pressure, so that the opening degree of the intake throttle 9 can be corrected on the basis of this calculated throttle correcting index. Specifically, as the turbo downstream intake pressure decreases, the throttle correcting index is set at a large value. Further, as the throttle correcting index becomes a larger value, the opening degree of the intake throttle 9 is further corrected to the opening side.

Accordingly, either the intake throttling amount or the intake pressure can be corrected to be an appropriate value by correcting the opening degree of the intake throttle 9 to the opening side, for example, on the basis of the turbo downstream intake pressure, even though either the intake throttling amount or the intake pressure tends to increase due to the intake throttling amount caused by the electrically operated generator 7. Thus, it is possible to correct the degree of increase in either the intake throttling amount, which corresponds to the amount of reduction in the intake pressure, or the amount of reduction in the engine torque changing corresponding to the electric power regeneration using the electrically operated generator 7. Accordingly, the electric power regeneration using the electrically operated generator 7 can be also performed in the normal range such as the low speed rotation range and the light load range of the engine 1, as well as the high speed rotation range of the engine 1.

Further, the opening degree of the EGR control valve 5 is corrected on the basis of the throttle correcting index. Specifically, as the throttle correcting index becomes large, the EGR correcting index is set large. Further, as the EGR correcting index becomes large, the opening degree of the intake throttle 9 is further corrected to the opening side. Thus, the EGR rate can be corrected to be an appropriate value, even when the electric power regeneration is performed by rotating the electrically operated generator 7 utilizing exhaust energy in the case where the EGR control valve 5 opens.

Therefore, for example, the improvement in the exhaust gas purifying performance and the improvement in the engine torque can be also accomplished using the turbocharger 6 in the electric power regenerating mode in the normal range such as the low speed rotation range and the light load range of a passenger car. Accordingly, the frequency of using the turbocharger 6 in the electric power regenerating mode can be increased. Further, the electric load of various kinds of electric devices can be significantly decreased when the electric power, which is generated in the electric power regeneration using the electrically operated generator 7, is returned to the battery 18 through an output voltage adjuster such as a rectifying circuit and a DC-DC converter of the electrically operated generator control circuit 17. This regenerated electric power is effectively practically used by being supplied as a part of consumed electric power of the various kinds of electric devices. Therefore, fuel efficiency can be enhanced since the driving load of the alternator is reduced for the amount of electric power generated in the electric power regeneration using the electrically operated generator 7. Here, the alternator serves as an engine auxiliary device operated by the engine 1.

In the above embodiment, the intake throttling amount, which corresponds to the operating state of the engine, is controlled at the appropriate amount by generally adjusting the opening degree of the throttle valve corresponding to the operating state of the engine. The rotary electric device has the operation as the electric generator mounted to the turbocharger. In this structure, when the electric power regeneration using this rotary electric device (electric generator) is performed, the electric generator is operated by the turbocharger. Accordingly, the electric power regeneration using the electric generator cause resistance (load) in intake air drawn from the turbocharger into a cylinder of the engine, and an intake throttling effect, which is equivalent to that of the intake throttling valve, is caused. Thus, when the electric power regeneration is performed using the electric generator, the intake throttling amount further increases correspondingly to an operating condition of the turbocharger or the electric generator, consequently, intake pressure further decreases.

Therefore, the intake air amount drawn into the cylinder of the engine may decrease resulting decrease in engine torque due to increase in the intake throttling amount causing reduction in the intake pressure. This reduction in the intake pressure corresponds to the electric power regeneration using the electric generator. The electric power regeneration using the electric generator may be also performed in the normal range such as the low speed rotation range and the light load range of the engine, as well as the high speed rotation range of the engine. Therefore, this electric power regeneration may become an obstacle for further obtaining the effect of the fuel efficiency improvement by increasing the frequency of performing the electric power regeneration using the electric generator.

Therefore, when the electric power regeneration using the electric generator is performed in the electric power regenerating mode, the intake throttling amount of the intake air, which is drawn from the turbocharger into the cylinder of the engine, is divided into the intake throttling amount using the electric generator and the intake throttling amount using the throttle valve. The degree of increase in the intake throttling amount using the electric generator can be estimated on the basis of the operating condition of the turbocharger or the electric generator. For example, this degree of increase in the intake throttling amount can be estimated in accordance with the changing amount of the rotation speed of the electric generator or the turbocharger, the amount of electric power generated using the electric generator, and the changing amount of the intake pressure. Therefore, the intake throttling amount, which tends to increase due to using the electric generator, is corrected to be an appropriate value by correcting the opening degree of the throttle valve to the opening side, for example, on the basis of the operating condition of the turbocharger or the electric generator.

Thus, it is possible to correct the degree of increase in the intake throttling amount, the amount of reduction in the intake pressure, and the amount of reduction in the engine torque, which change corresponding to the electric power regeneration using the electric generator. Thus, the electric power regeneration using the electric generator can be also performed in the low speed rotation range and the light load range, as well as the high speed rotation range of the engine. Therefore, the frequency of performing the electric power regeneration using the electric generator can be increased. Accordingly, the driving load of the alternator, as the engine auxiliary device, can be further reduced, and fuel efficiency can be further enhanced.

In the above embodiment, the opening degree correcting amount of the throttle valve is calculated on the basis of the intake pressure, which is on the downstream side of the turbocharger with respect to the airflow direction, detected using the intake pressure detecting unit. The reduction in the intake pressure changes corresponding to the electric power regeneration using the electric generator. Thus, the amount of reduction in the engine torque can be corrected, even though the engine torque decreases corresponding to the increase in the intake throttling amount due to the electric power regeneration.

In the above embodiment as the rotation speed of one of the electric generator and the turbocharger increases, the amount of electric power generated using the electric generator further increases. Further, as the amount of electric power generated using the electric generator increases, the intake throttling amount further increases and the intake pressure further decreases. Therefore, the opening degree correcting amount of the throttle valve is preferably set at a large value, as the intake pressure, which is on the downstream side of the turbocharger with respect to the airflow direction changes. The intake pressure may be detected using the intake pressure detecting unit.

In the above embodiment, for example, the opening degree of the EGR control valve is corrected to the opening side, for example, on the basis of the opening degree correcting amount of the throttle valve. Thus, the EGR amount, which tends to decrease due to correcting the opening degree of the throttle valve to the opening side, can be corrected to be an appropriate value. Further, as the opening degree correcting amount of the throttle valve becomes a larger value, the opening degree of the EGR control valve may be also increased.

In the above embodiment, the electrically operated generator, which is for performing supercharging assist by rotating the compressor and the turbine, also has the operation as the electric generator for performing the electric power regeneration by rotating this electric generator utilizing exhaust energy. This electrically operated generator is provided substantially coaxially with the compressor and the turbine. The electrically operated generator is arranged between the compressor and the turbine.

In the above embodiment, when it is determined that the supercharging assist is required by the supercharging assist determining unit, it is switched to the supercharging assist mode for operating the turbocharger by the electrically operated generator. Further, when it is determined that no supercharging assist is required by the supercharging assist determining unit, it is switched to the electric power regenerating mode for operating the electrically operated generator by the turbocharger.

Here, it may be also evaluated whether it is an accelerating state or a stationary state so as to evaluate whether the supercharging assist is required or not. Further, it may be also evaluated whether an accelerator position changing ratio is equal to or greater than a predetermined value. In this case, the electric power regeneration using the electric generator can be also performed in the low speed rotation range or the light load range, as the normal range of the engine, as well as the high speed rotation range of the engine. Therefore, the executing frequency of the electric power regeneration using the electric generator can be increased. Accordingly, the driving load of an alternator, as an engine auxiliary device, can be reduced, and fuel efficiency can be enhanced.

Second Embodiment

Figure 7:
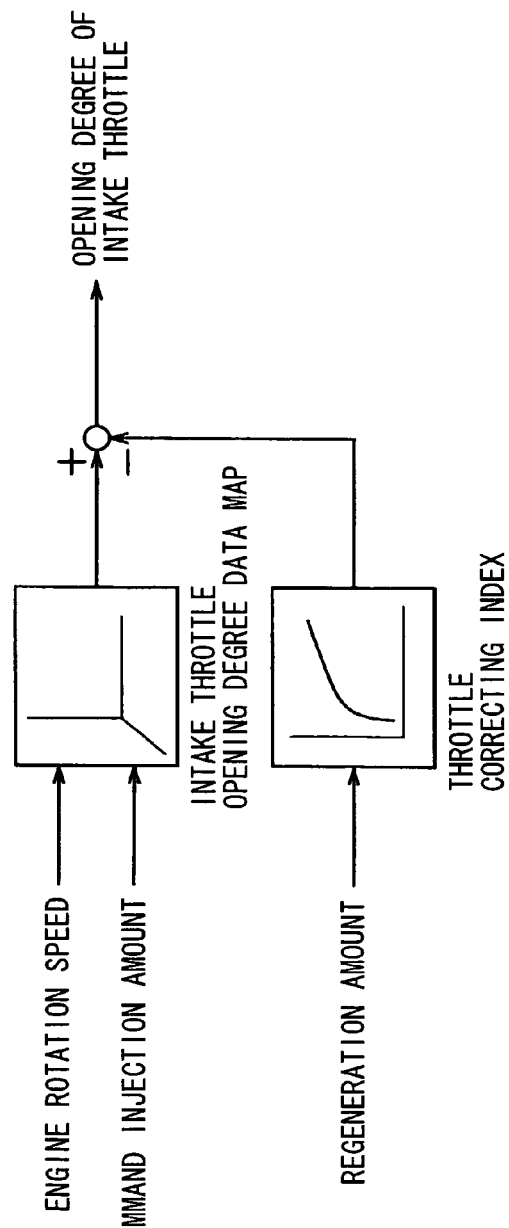
FIG. 7 is a block diagram showing a control logic of an opening degree of the intake throttle, according to the second embodiment.
Figure 6:
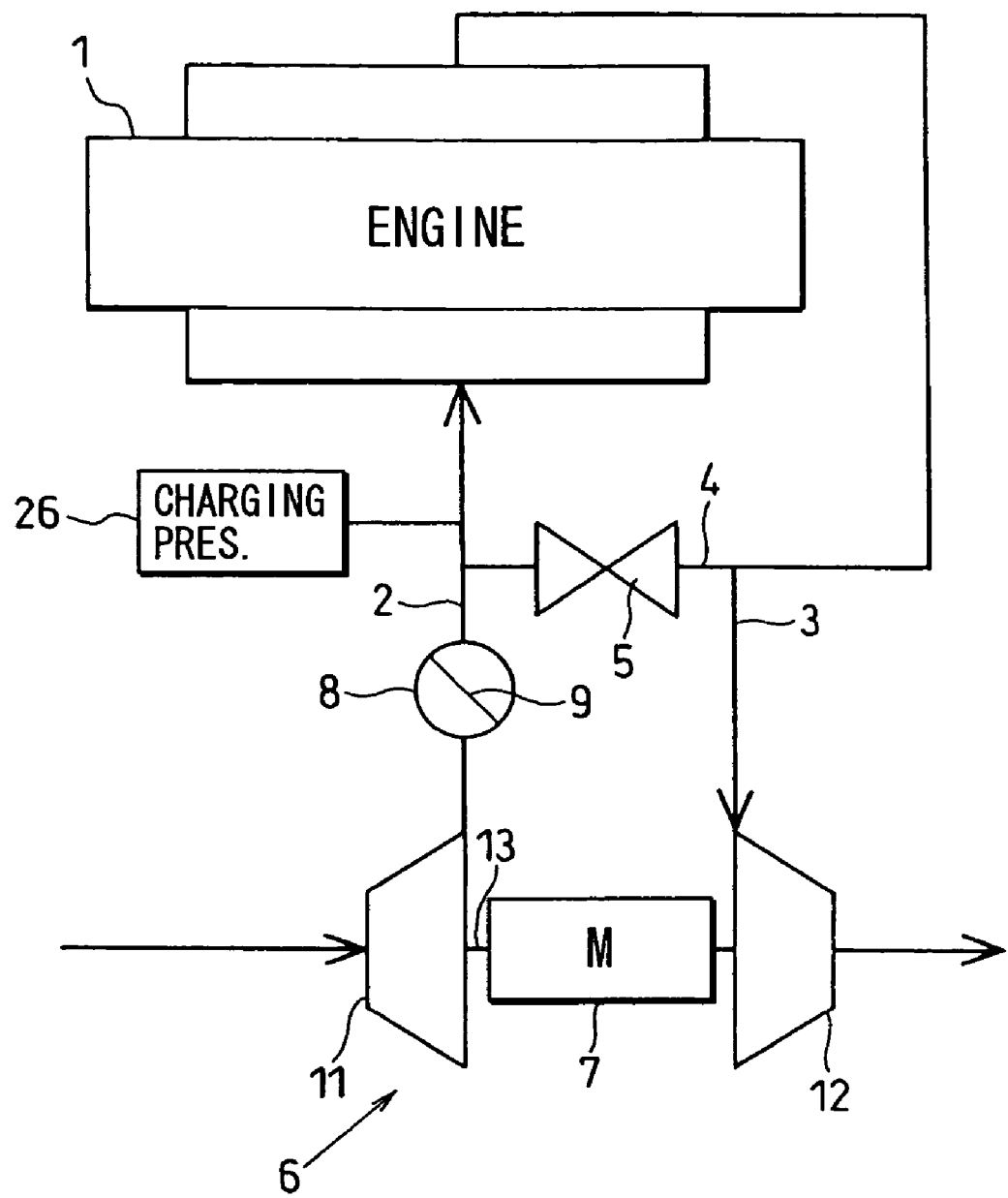
FIG. 6 is a schematic view showing an engine with a turbocharger, according to a second embodiment of the present invention.

FIG. 6 depicts an engine with a turbocharger and peripheral devices thereof. The control logic shown in FIG. 7, which depicts a calculating method of the throttle correcting index, when the turbo downstream intake pressure is indirectly detected, is repeated at predetermined regular intervals after the ignition switch is turned on, for example. The fuel injection amount (command injection amount), which corresponds to an amount of fuel injected and supplied into the combustion chamber of each cylinder of the engine 1, may be also individually arithmetically calculated for each cylinder of the engine 1.

In this embodiment, when the turbocharger 6 is used in the electric power regenerating mode, resistance arises in rotation of the compressor 11 and the turbine 12 and the resistance becomes load on the intake air, as the amount of electric power generated using the electrically operated generator 7 increases. Therefore, the intake pressure on the downstream side of the compressor 11 of the turbocharger 6 with respect to the airflow direction decreases. Therefore, the amount of electric power generated using the electrically operated generator 7 is detected on the basis of the rotation speed of the electrically operated generator 7 using an electric power generation detecting unit 28 (FIG. 6) so as to indirectly detect the turbo downstream intake pressure. Therefore, the intake pressure sensor 27 of first embodiment can be omitted. Here, the electric power generation detecting unit 28 serves as the operating condition detecting unit.

In the engine control system with the turbocharger of this embodiment, the throttle correcting index in consideration of the amount of electric power generated using the electrically operated generator 7 is added to or subtracted from the base value of the intake throttle opening degree by the throttle opening correcting unit. This base value of the intake throttle opening degree is calculated from the engine rotation speed NE and the command injection amount in the electric power regenerating mode. Specifically, as the amount of electric power generated using the electrically operated generator 7 increases, the opening degree of the intake throttle 9 is further corrected to the opening side, so that the reduction of the engine torque can be restricted.

In this embodiment, the opening degree correcting amount of the throttle valve is calculated on the basis of the amount of electric power generated using the electric generator detected using the electric power generation detecting unit 28. Thus, it is possible to correct the amount of reduction in the engine torque, which corresponds to the degree of increase in the intake throttling amount or the amount of reduction in the intake pressure changing corresponding to the electric power regeneration, even when the intake pressure sensor 27 of first embodiment is not used.

In this embodiment, as the rotation speed of the electric generator or the turbocharger increases, the amount of electric power generated using the electric generator further increases. Further, as the amount of electric power generated using the electric generator increases, the intake throttling amount further increases and the intake pressure further decreases. Therefore, as the amount of regenerated electric power detected using the electric power generation detecting unit 28 increases, it is preferably set the opening degree correcting amount of the throttle valve at a large value.

MODIFIED EXAMPLE

In the above embodiments, the control target value, such as the intake throttle opening degree and the target throttle opening degree, is calculated in accordance with the engine rotation speed NE and the command injection amount. However, the control target value may be also calculated in accordance with the engine rotation speed NE and the accelerator position. Further, instead of the command injection amount, the control target value may be also calculated using a basic injection amount and a command injection period.

In the above embodiments, when the accelerator position changing ratio is equal to or greater than a predetermined value, it is determined to be in an accelerating state requiring the supercharging assist. However, when either a command injection amount changing ratio or a target fuel pressure changing ratio is equal to or greater than a predetermined value, it may be also determined to be in an accelerating state requiring the supercharging assist. Further, when the accelerator position changing ratio is equal to or greater than a first predetermined value, it may be also determined to be in an accelerating state because of stepping the accelerator pedal, and it may be also switched to a supercharging assist mode. Further, when the accelerator position changing ratio is equal to or less than a second predetermined value, which is less than the first predetermined value, it may be also determined to be in a decelerating state because of returning the accelerator pedal, and it may be also switched to the electric power regenerating mode. Further, when a road condition for running a vehicle is an upward slope, it may be also switched to the supercharging assist mode. Further, when the road condition for running the vehicle is a downward slope, it may be also switched to the electric power regenerating mode.

In the above embodiments, the rotation speed of the electrically operated generator 7 is controlled by adjusting the output electric current of the inverter of the electrically operated generator control circuit 17 on the basis of a control signal of the ECU 10. However, the rotation speed of the electrically operated generator 7 may be also controlled by adjusting an alternating current voltage and a frequency output from the inverter on the basis of the control signal of the ECU 10. Further, electric power generated in the electric power regeneration using the electrically operated generator 7 may be supplied to an electric resistor such as an electric heater and may be also consumed as heat without returning this regenerated electric power to the battery 18. Further, the electric power generated in the electric power regeneration using the electrically operated generator 7 may be also reutilized as electric power applied to the electrically operated generator 7 in the following supercharging assist mode. Further, instead of the electrically operated generator 7, a rotary electric device serving only as the electric generator may be also mounted to the turbocharger 6.

In the above embodiments, the opening degree of the intake throttle 9 is further corrected to the opening side, as the turbo downstream intake pressure detected using the intake pressure sensor 27 decreases, or as the amount of electric power generated using the electrically operated generator 7 increases. However, the opening degree of the intake throttle 9 may be also further corrected to the opening side, as either the rotation speed of the rotor shaft 13 of the turbocharger 6 or the electrically operated generator 7 increases. Further, the opening degree of the intake throttle 9 may be also further corrected to the opening side when the new intake air amount detected using the air flow meter 22 decreases.

Further, the degree of either increase in the intake throttling amount or increase in the amount of reduction in the intake pressure changes in accordance with the electric power regeneration using the electrically operated generator 7. The degree of either increase in the intake throttling amount or increase in the amount of reduction in the intake pressure may be estimated on the basis of at least one of the rotation speed of the turbocharger 6, the rotation speed of the electrically operated generator 7, the turbo downstream intake pressure detected using the intake pressure sensor 27, the amount of electric power generated using the electrically operated generator 7, and the new intake air amount. The opening degree of the intake throttle 9 may be also further corrected to the opening side on the basis of either the estimated degree of increase in the intake throttling amount or the estimated amount of reduction in the intake pressure.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A control system for an internal combustion engine, the system comprising:
    a turbocharger configured to supercharge intake air drawn into the internal combustion engine utilizing energy of exhaust gas of the internal combustion engine, the turbocharger including an electric generator configured to generate regenerative electric power utilizing energy of exhaust gas;
    a throttle valve configured to control a flow amount of intake air supercharged using the turbocharger;
    an operating condition detecting unit configured to detect an operating condition of at least one of the turbocharger and the electric generator; and
    a throttle opening correcting unit configured to correct an opening degree of the throttle valve on the basis of the operating condition of the at least one of the turbocharger and the electric generator in response to generating of regenerative electric power by the electrical generator;
    wherein the operating condition detecting unit includes an intake pressure detecting unit that is configured to detect intake pressure downstream of the turbocharger with respect to an airflow direction;
    wherein the throttle opening correcting unit is configured to calculate an opening degree correcting amount of the throttle valve on the basis of the intake pressure detected by the intake pressure detecting unit; and
    wherein the throttle opening correcting unit increases the opening degree correcting amount of the throttle valve as the intake pressure detected by the intake pressure detecting unit decreases.

2. The system according to claim 1, wherein the opening degree of the throttle valve is increased as the opening degree correcting amount of the throttle valve is increased.

3. The system according to claim 1, further comprising:
    an EGR device that includes an EGR pipe and an EGR control valve, the EGR pipe configured to return exhaust gas of the internal combustion engine partially into an intake passage on the downstream side of the throttle valve with respect to an airflow direction, the EGR control valve configured to control an EGR amount, for which exhaust gas returns through the EGR pipe; and
    an EGR rate correcting unit configured to correct the opening degree of the EGR control valve on the basis of the opening degree correcting amount of the throttle valve.

4. The system according to claim 1,
    wherein the operating condition detecting unit includes an electric power generation detecting unit configured to detect an amount of electric power generated by the electric generator; and
    wherein the throttle opening correcting unit calculates an opening degree correcting amount of the throttle valve on the basis of the amount of electric power detected using the electric power generation detecting unit.

5. The system according to claim 4, wherein the throttle opening correcting unit increases the opening degree correcting amount of the throttle valve as the amount of electric power generation detected by the electric power generation detecting unit increases.

6. The system according to claim 4, further comprising:
    an EGR device having an EGR pipe and an EGR control valve, the EGR pipe configured to return exhaust gas of the internal combustion engine partially into an intake passage on the downstream side of the throttle valve with respect to an airflow direction, the EGR control valve configured to control an EGR amount by which exhaust gas returns through the EGR pipe; and
    an EGR rate correcting unit configured to correct the opening degree of the EGR control valve on the basis of the opening degree correcting amount of the throttle valve.

7. The system according to claim 1,
    wherein the turbocharger includes a compressor and a turbine,
    wherein the compressor is rotatably accommodated in an engine intake pipe,
    wherein the turbine is rotatably accommodated in an engine exhaust pipe,
    wherein the electric generator is provided between the compressor and the turbine,
    wherein the electric generator is substantially coaxial with the compressor and the turbine, and
    wherein the electric generator is an electrically operated generator configured to assist supercharging by rotating the compressor and the turbine as an electric motor.

8. The system according to claim 7, further comprising:
    a supercharging assist determining unit configured to evaluate whether the supercharging assist is required; and
    a mode switching unit configured to switch between a supercharging assist mode, in which the electrically operated generator drives the turbocharger, and an electric power regenerating mode, in which the turbocharger drives the electrically operated generator,
    wherein the mode switching unit selectively performs the switching operation to one of the supercharging assist mode and the electric power regenerating mode on the basis of a determination made by the supercharging assist determining unit.

9. A control system for an internal combustion engine that connects with an intake pipe and an exhaust pipe, the system comprising:
    a turbocharger that includes a compressor, a turbine, and an electric generator, the compressor being rotatably accommodated in the intake pipe, the turbine being rotatably accommodated in the exhaust pipe, and the electric generator being arranged between the compressor and the turbine;
    a throttle valve that is rotatably accommodated in the intake pipe downstream of the compressor;
    a control unit configured to control the throttle valve for throttling a flow area in the intake pipe;

an EGR pipe that connects the exhaust pipe with the intake pipe, the EGR pipe connecting with a location downstream of the throttle valve in the intake pipe; and an EGR control valve configured to throttle a flow area in the EGR pipe, wherein the control unit controls the throttle valve to open in response to generation of electric power by the electrical generator; and wherein the control unit controls the EGR control valve to open when the control unit controls the throttle valve to open in response to generation of electric power by the electrical generator.

10. The system according to claim 9, wherein the turbine is configured to utilize energy of exhaust gas for supercharging intake air, which is drawn into the internal combustion engine using the compressor, wherein the electric generator is configured to drive the compressor to assist supercharging by the compressor, and wherein the control unit controls the throttle valve to close at least partially in response to the electric generator's assistance of supercharging by the compressor.

11. The system according to claim 10, wherein the control unit controls the EGR control valve to open in response to an increase in pressure in the intake pipe when the electric generator assists supercharging of the turbine.

12. A control system for an internal combustion engine that connects with an intake pipe and an exhaust pipe, the system comprising:

a turbocharger that includes a compressor, a turbine, and an electric generator, the compressor being rotatably accommodated in the intake pipe, the turbine being rotatably accommodated in the exhaust pipe, and the electric generator being arranged between the compressor and the turbine;

a throttle valve that is rotatably accommodated in the intake pipe downstream of the compressor; and a control unit configured to control the throttle valve to throttle a flow area in the intake pipe, wherein the control unit controls the throttle valve to open in response to a reduction in pressure in the intake pipe, the reduction in pressure caused by regenerating of electric power by the electric generator which includes the application of a load to the electric generator that reduces a rotation speed of the generator.

13. The control system according to claim 12, wherein the control unit controls the throttle valve to open in response to a condition in which:

pressure in the intake pipe decreases because of the reduction in rotation speed of the electric generator; and a rotation speed of the internal combustion engine is less than a predetermined value.

14. The control system according to claim 12, wherein the control unit controls the throttle valve to open in response to a condition in which:

pressure in the intake pipe decreases because of the reduction in rotation speed of the electric generator; and the internal combustion engine is in an idling condition.

15. A control system for an internal combustion engine, the system comprising:

a turbocharger that supercharges intake air drawn into the internal combustion engine utilizing energy of exhaust gas of the internal combustion engine, the turbocharger including an electric generator that generates regenerative electric power utilizing energy of exhaust gas;

a throttle valve that controls a flow amount of intake air supercharged by the turbocharger;

an operating condition detector that detects an operating condition of at least one of the turbocharger and the electric generator;

a throttle opening correcting unit configured to correct an opening degree of the throttle valve on the basis of the operating condition of the turbocharger and/or the electric generator in response to regeneration of regenerative electric power by the electrical generator.

16. A control system for an internal combustion engine, the system comprising:

a turbocharger configured to supercharge intake air drawn into the internal combustion engine utilizing energy of exhaust gas of the internal combustion engine, the turbocharger including an electric generator configured to generate regenerative electric power utilizing the energy of the exhaust gas;

a throttle valve configured to control a flow amount of intake air supercharged by the turbocharger;

an operating condition detecting unit configured to detect an operating condition of at least one of the turbocharger and the electric generator;

a throttle opening correcting unit configured to correct an opening degree of the throttle valve on the basis of the operating condition of the at least one of the turbocharger and the electric generator in response to regenerating of regenerative electric power by the electrical generator;

wherein the operating condition detecting unit includes an electric power generation detecting unit that is configured to detect an amount of electric power generated using the electric generator;

the throttle opening correcting unit calculates an opening degree correcting amount of the throttle valve on the basis of the amount of electric power detected by the electric power generation detecting unit; and the throttle opening correcting unit increases the opening degree correcting amount of the throttle valve as the amount of electric power generation detected by the electric power generation detecting unit increases.

17. The control system according to claim 16, wherein the operating condition detecting unit includes an intake pressure detecting unit that is configured to detect intake pressure downstream of the turbocharger with respect to an airflow direction;

wherein the throttle opening correcting unit is configured to calculate an opening degree correcting amount for the throttle valve on the basis of the intake pressure detected by the intake pressure detecting unit; and wherein the throttle opening correcting unit increases the opening degree correcting amount for the throttle valve as the intake pressure detected by the intake pressure detecting unit decreases.

18. The control system according to claim 1, further comprising:

a power regeneration detection unit configured to detect a condition indicating that the electrical generator is generating regenerative electric power;

wherein the throttle opening correcting unit is configured to correct the opening degree of the throttle valve on the basis of the operating condition of the at least one of the turbocharger and the electric generator in response to a detection by the power regeneration detection unit of the condition indicating that the electrical generator is generating regenerative electric power.

19. The control system according to claim 16, further comprising:
  a power regeneration detection unit configured to detect a condition indicating that the electrical generator is generating regenerative electric power;
  wherein the throttle opening correcting unit is configured to correct the opening degree of the throttle valve on the basis of the operating condition of the at least one of the turbocharger and the electric generator in response to a detection by the power regeneration detection unit of the condition indicating that the electrical generator is generating regenerative electric power.

* * * * *